(12) United States Patent
Morrison et al.

(10) Patent No.: US 10,554,245 B2
(45) Date of Patent: Feb. 4, 2020

(54) TRANSMIT AND RECEIVE COMBINING USING CIRCULATOR WITH DISTORTION CANCELLATION

(71) Applicant: Andrew Wireless Systems GmbH, Buchdorf (DE)

(72) Inventors: Charles B. Morrison, Forest, VA (US); Gregory Allan Maca, Lynchburg, VA (US)

(73) Assignee: Andrew Wireless Systems GmbH, Buchdorf (DE)

(*) Notice: Subject to any disclaimer, the term of this patent is extended or adjusted under 35 U.S.C. 154(b) by 77 days.

(21) Appl. No.: 15/568,328

(22) PCT Filed: Dec. 8, 2015

(86) PCT No.: PCT/IB2015/059445
§ 371 (c)(1),
(2) Date: Oct. 20, 2017

(87) PCT Pub. No.: WO2016/170407
PCT Pub. Date: Oct. 27, 2016

(65) Prior Publication Data
US 2018/0138938 A1    May 17, 2018

Related U.S. Application Data

(60) Provisional application No. 62/152,115, filed on Apr. 24, 2015.

(51) Int. Cl.
*H04B 1/48* (2006.01)
*H04B 1/52* (2015.01)

(52) U.S. Cl.
CPC .................. *H04B 1/48* (2013.01); *H04B 1/52* (2013.01)

(58) Field of Classification Search
CPC ... H04B 1/48; H04B 1/52; H04B 1/62; H04B 1/525; H04B 15/00; H04B 1/123; H04B 1/38
See application file for complete search history.

(56) References Cited

U.S. PATENT DOCUMENTS 8,218,677 B2 * 7/2012 Jin ......................... H04L 27/368
330/149
8,379,699 B2 * 2/2013 Smiley ................. H04B 1/7097
375/219

(Continued)

FOREIGN PATENT DOCUMENTS

| CN | 103650358 A | 3/2014 |
| EP | 2752997 A1 | 7/2014 |
| WO | 2012166961 A1 | 12/2012 |

OTHER PUBLICATIONS

International Searching Authority, International Search Report and Written Opinion from PCT Application No. PCT/IB2015/059445, dated Mar. 3, 2016, pp. 1-12, WO.

(Continued)

*Primary Examiner* — Pablo N Tran
(74) *Attorney, Agent, or Firm* — Fogg & Powers LLC

(57) ABSTRACT

A telecommunications system may include a distortion cancellation subsystem for use with a circulator device coupling an antenna to a transmit path and a receive path. The distortion cancellation subsystem may include a correction circuit and a cancellation circuit. In some aspects, the correction circuit may include a processing device or adaptive filter to correct imperfections in transmit signal samples generated by directional couplers. The correction circuit may also include a summing device to remove receive signal components from the transmit signal samples. The cancellation circuit may receive the output signal of the correction circuit via an adaptive filter. The output of the adaptive filter (Continued)

may be summed with a receive signal to minimize distortion of the receive signal.

20 Claims, 5 Drawing Sheets

(56) References Cited

U.S. PATENT DOCUMENTS

| | | | | |
|---|---|---|---|---|
| 8,755,758 | B2* | 6/2014 | Andersson | H04B 1/525 |
| | | | | 455/114.2 |
| 8,818,299 | B2* | 8/2014 | Morrison | H04B 1/525 |
| | | | | 455/78 |
| 8,880,010 | B2* | 11/2014 | Ballantyne | H04J 11/0023 |
| | | | | 455/114.2 |
| 2010/0197231 | A1* | 8/2010 | Kenington | H04B 1/525 |
| | | | | 455/63.1 |
| 2011/0170473 | A1* | 7/2011 | Proctor, Jr. | H04B 1/525 |
| | | | | 370/315 |
| 2012/0201153 | A1* | 8/2012 | Bharadia | H04B 1/525 |
| | | | | 370/252 |
| 2013/0155913 | A1 | 6/2013 | Sarca | |
| 2014/0161159 | A1* | 6/2014 | Black | H04B 15/00 |
| | | | | 375/219 |

OTHER PUBLICATIONS

State Intellectual Property Office, P.R. China, "Office Action from CN Application No. 201580077631.6 dated Dec. 24, 2018", from Foreign Counterpart to PCT Application No. PCT/IB2015/059445, Dec. 24, 2018, pp. 1-13, Published: CN.

* cited by examiner

TRANSMIT AND RECEIVE COMBINING USING CIRCULATOR WITH DISTORTION CANCELLATION

This application is a U.S. National Stage application of PCT Application Serial No. PCT/IB2015/059445, filed 8 Dec. 2015 and titled "Transmit and Receive Combining Using Circulator with Distortion Cancellation," which claims the benefit of to U.S. Provisional Application Ser. No. 62/152,115, filed Apr. 24, 2015 and titled "Transmit and Receive Combining Using Circulator with Distortion Cancellation," the contents of all of which are incorporated herein by reference.

TECHNICAL FIELD

The present disclosure relates generally to telecommunications, and, more particularly (although not necessarily exclusively), to circulator distortion cancellation subsystems for use in telecommunications systems.

BACKGROUND

A telecommunications system may include a distributed antenna system ("DAS"), a repeater, a radio access network, or another system that may be used to extend the coverage of a cellular communication system. For example, a DAS may extend coverage to areas of traditionally low signal coverage within buildings, tunnels, or in areas obstructed by terrain features. A DAS may include one or more head-end units in communication with carrier systems, such as base transceiver stations of cellular service providers. The DAS may also include remote units physically separated from the head-end unit, but in communication with the head-end unit via a suitable communication medium. In some aspects, a DAS may be equipped with components that create distortion products that are within receive bandwidths. The distortion products may include undesired interference to received signals.

SUMMARY

According to one aspect of the present disclosure, a telecommunications system may include a circulator device that may couple an antenna to a transmit path and a receive path. The antenna may be positionable in the telecommunications system to transmit downlink signals and receive uplink signals. The telecommunications system may also include directional couplers that may be coupled to the antenna to generate samples of a transmit signal routed to the antenna by the circulator device. A correction circuit may be coupled to the directional couplers to correct imperfections in the samples due to finite directivity of the directional couplers. The correction circuit may include a processing device and a database device. The database device may include calibration information that is usable by the processing device to correct the imperfections in the samples. An adaptive filter may be coupled to the correction circuit to generate an output signal. The output signal may be generated by adjusting a level and a phase of the corrected transmit signal. A summer device may be positioned in the receive path to sum the output signal and a receive signal traversing the receive path to reduce distortion of the receive signal by the transmit signal.

According to another aspect of the present disclosure, a distortion cancellation sub-system may include a correction circuit and a cancellation circuit. The correction circuit may be couplable to a first directional coupler and a second directional circuit to receive a first sample and a second sample of a transmit signal routed to an antenna by a circulator device. The correction circuit may include a first adaptive filter that may be coupled to a processing device and a first summer device. The first adaptive filter may be positioned in the correction circuit to correct imperfections in the first sample and the second sample caused by finite directivity of the first directional coupler and the second directional coupler. The cancellation circuit may be coupled to a receive path to receive a receive signal routed to the receive path by the circulator device. The cancellation circuit may also be coupled to the correction circuit to receive a corrected transmit signal generated by the correction circuit. The cancellation circuit may include a second adaptive filter and a second summer device. The second adaptive filter may be coupled to the correction circuit to generate an output signal using the corrected transmit signal. The second summer device may be coupled to the receive path and to the second adaptive filter to reduce distortion of the receive signal by transmit signal components.

According to another aspect of the present disclosure, a method may include receiving samples of a transmit signal from directional couplers. The method may also include receiving a receive signal traversing the receive path from a circulator device. The method may also include generating a corrected transmit signal by correcting imperfections in the samples due to finite directivity of the directional couplers. The method may also include generating, by an adaptive filter, an output signal by adjusting a level and a phase of the corrected transmit signal. The method may also include summing, via a summer device, the receive signal and the output signal to reduce a distortion of the receive signal by the transmit signal.

DETAILED DESCRIPTION

Certain aspects and examples relate to a telecommunications system including a distortion cancellation subsystem for a circulator device that couples an antenna to both a receive path and a transmit path. The distortion cancellation subsystem may include a correction circuit and a cancellation circuit. The correction circuit may receive samples of a transmit signal via directional couplers coupled to the antenna and may process the samples to correct for finite directivity in the samples caused by the directional couplers. In some aspects, the finite directivity may be, in part, a result of the limited isolation properties of the directional couplers and may cause errors in a measurement of the samples. The correction circuit may include a processing device coupled to an adaptive filter to identify and correct the imperfections of the samples. The output of the adaptive filter may be summed with an unprocessed sample from the directional couplers to generate a corrected transmit signal having only (or mostly) transmit signal components. The cancellation circuit may receive both a receive signal traversing the receive path and the corrected transmit signal from the correction circuit. In some aspects, the cancellation circuit may include an adaptive filter coupled to the correction circuit to adjust a phase and power level of the corrected transmit signal. The output of the adaptive filter may be summed with the receive signal to cancel or otherwise minimize distortion of the receive signal by the transmit signal components.

A distortion cancellation subsystem according to some aspects of the present disclosure may be useful in a telecommunications system using circulator devices as a combining device to combine a transmit path and a receive path. For example, a correction circuit of a distortion cancellation subsystem may effectively generate a sample of a transmit signal having only or mostly transmit signal components. Unlike other combining devices that may be linear and create no distortions, circulator devices may make it difficult to obtain samples of a transmit signal containing minimal or no components of a desired receive signal.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
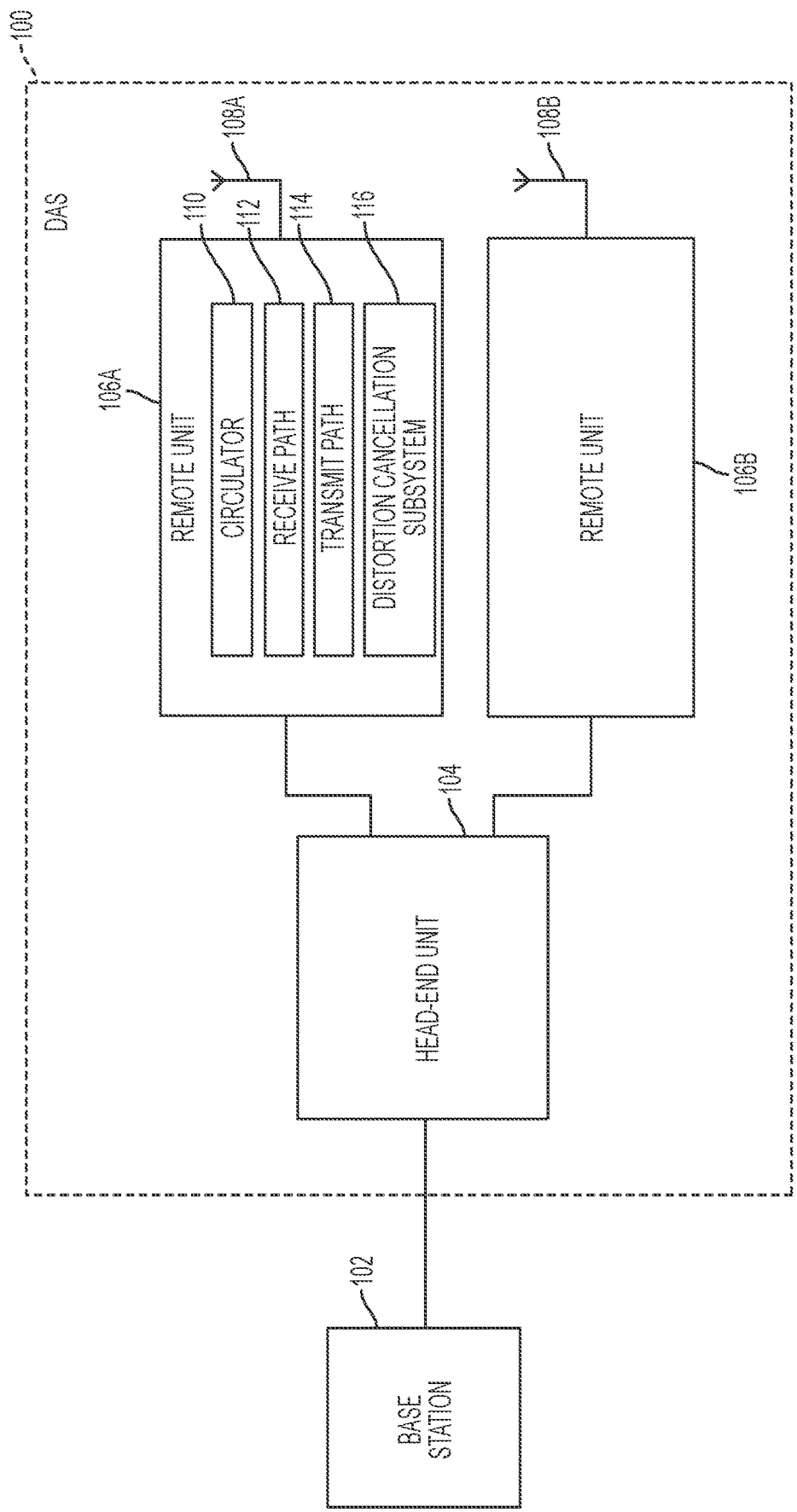
FIG. 1 is a block diagram of an example of an environment for a telecommunications system that may include a distortion cancellation subsystem according to one aspect.

FIG. 1 is a block diagram of an example of a telecommunications system environment that may be used for implementing a distortion cancellation subsystem according to some aspects of the present disclosure. The telecommunications system in FIG. 1 is a DAS 100, but other types of telecommunications systems may be used. The DAS 100 may be communicatively coupled to a base station 102 via a head-end unit 104 in the DAS 100. The DAS 100 also includes the head-end unit 104 and multiple remote units 106A, 106B. Each remote unit 106A, 106B includes an antenna 108A, 108B, respectively. Although FIG. 1 shows only one head-end unit 104 and two remote units 106A, 106B, the DAS 100 may include any number of head-end units and remote units without departing from the scope of the present disclosure. In some aspects, the head-end unit 104 may include a master unit or other suitable unit that may communicate with one or more base stations or other transceiver devices in the DAS 100. In some aspects, the head-end unit 104 may include an optical transceiver or other suitable mechanism that may transmit signals to the remote units 106A, 106B. The head-end unit 104 may communicate with remote units 106A, 106B in different coverage zones of the same DAS 100.

In some aspects, the remote units 106A, 106B may wirelessly communicate with terminal devices positioned in one or more coverage areas of the DAS 100 serviced by the remote units 106A, 106B. For example, the remote units 106A, 106B may be positioned in a building, tunnel, or other structure that prevents or limits communications directly with a carrier. Non-limiting examples of terminal devices may include mobile stations, mobile devices, access terminals, subscriber stations, remote stations, user terminals, subscriber units, cellular phones, smartphones, etc. The remote units 106A, 106B may amplify downlink signals received from the base station 102 via the head-end unit 104 and radiate the downlink signals using the antennas 108A, 108B, respectively. The head-end unit 104 may be communicatively coupled to the base station 102 and the remote units 106A, 106B in any suitable manner. A suitable communication link may be a wired connection or a wireless connection. Examples of wired connections may include, but are not limited to, a connection via a copper cable, an optical fiber, or another suitable communication medium. Examples of wireless connections may include, but are not limited to, a wireless RF communication link or a microwave link. The remote units 106A, 106B may further recover uplink signals from mobile user equipment and provide the uplink signals to the head-end unit 104. In some aspects, the uplink signals may be summed together at the head-end unit 104 and provided to the base station 102.

The type of communication link between the base station 102 and the head-end unit 104 may be the same as or different from the type of communication link between the head-end unit 104 and the remote units 106A, 106B. Although FIG. 1 depicts direct links between the head-end unit 104 and the remote units 106A, 106B, other implementations are possible. For example, in some aspects, the head-end unit 104 may be communicatively coupled to the remote units 106A, 106B via one or more extension units or other intermediate devices.

In some aspects, a remote unit 106A may include a circulator device 110. The circulator device 110 may couple the antenna 108A of the remote unit 106A to a receive path 112 and a transmit path 114 of the remote unit 106A, 106B. The receive path 112 and the transmit path 114 may include one or more communicatively linked components forming a signal path. Examples of communication links between the components forming the receive path 112 or the transmit path 114 may include, but are not limited to, electrical cable, optical fiber, or another suitable communication medium. In some examples, aspects of the receive path 112 or transmit path 114 may include free space.

The remote unit 106A may also include a distortion cancellation subsystem 116 that may be coupled to the circulator device 110 via a port of the antenna 108A or via the receive path 112. Although the circulator device 110 and the distortion cancellation subsystem 116 are shown disposed in the remote unit 106A in FIG. 1, the circulator device 110 and the distortion cancellation subsystem 116 may be disposed in any unit or multiple units of the DAS 100 (e.g., the head-end unit 104, remote unit 106B, extension units, etc.).

Figure 2:
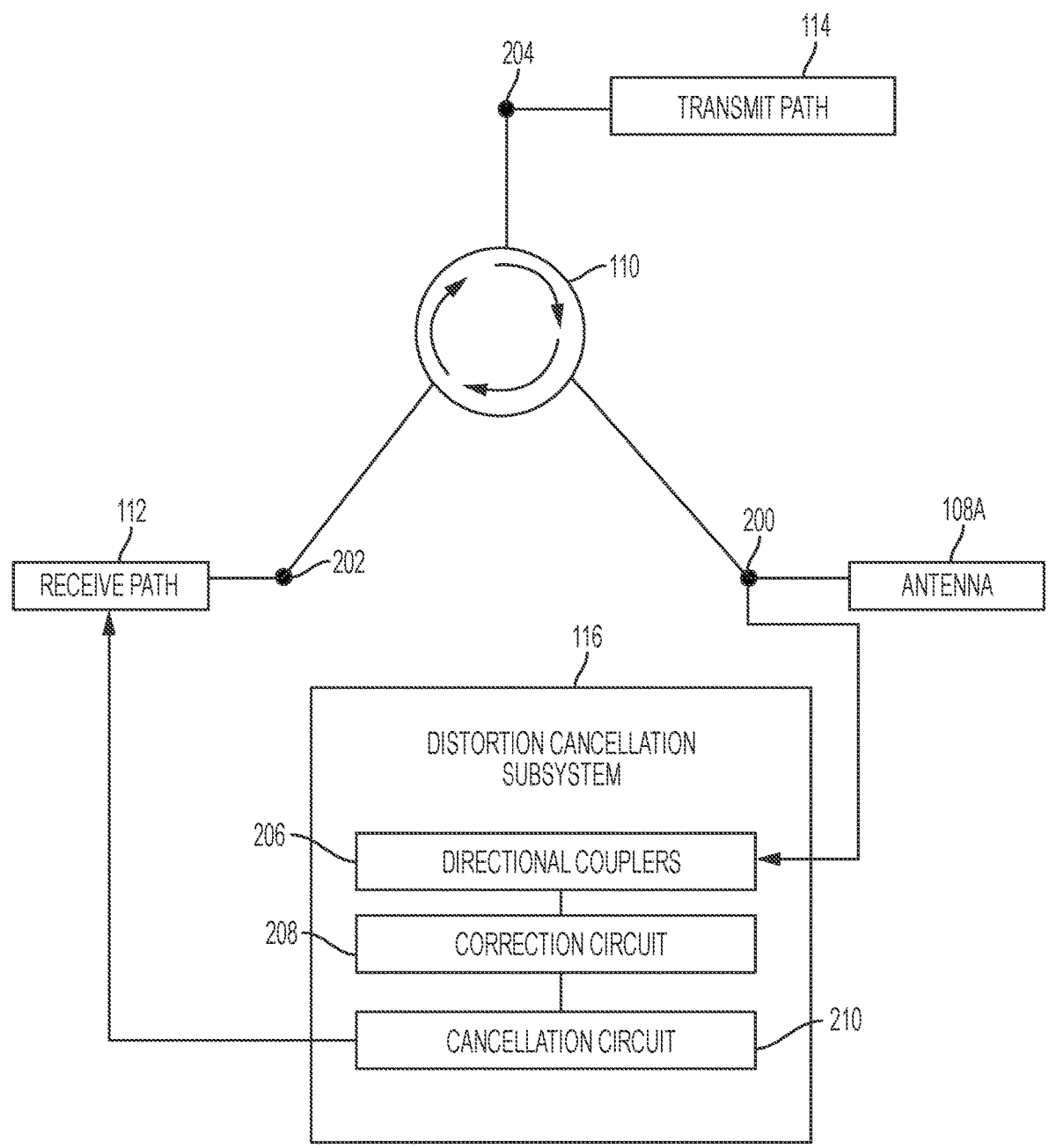
FIG. 2 is a partial block diagram of an example of a circulator device and a distortion cancellation subsystem according to one aspect.

FIG. 2 shows the circulator device 110 and a block diagram of the antenna 108A, the receive path 112, the transmit path 114, and the distortion cancellation subsystem 116. The circulator device may be a three-port device that may pass radio frequency ("RF") power unidirectionally in a circular manner. The circulator device 110 includes three ports 200, 202, 204. Power, as illustrated by the arrows within the circulator device 110, may be passed from port 200 to port 202, from port 202 to port 204, and from port 204 to port 200. In some aspects, the circulator device 110 may prevent power from passing in the reverse direction (e.g., from port 200 to port 204). The circulator device 110 is coupled to the antenna 108A at port 200, the receive path 112 at port 202, and the transmit path 114 at port 204. A transfer of power between the ports 200, 202, 204 may allow the circulator device 110 to combine a transmitter and receiver, via the transmit path 114 and the receive path 112, respectively, to the antenna 108A. In this manner, the antenna 108A may be a shared antenna for the transmitter and receiver and port 200 may be an antenna port for the antenna 108A. In some aspects, power may be transferred by the circulator device 110 from the transmit path 114, via port 204, to the antenna 108A, via port 200 and from the antenna 108A, via port 200, to the receive path 112, via port 202, but no power may be passed from the transmit path 114 directly to the receive path 112.

The distortion cancellation subsystem 116 may be coupled to the circulator device 110 and the antenna 108A at port 200. The distortion cancellation subsystem 116 may also be coupled to the receive path 112 at port 202. The distortion cancellation subsystem 116 may be coupled to the circulator device 110 and the antenna 108A via directional couplers 206. The distortion cancellation subsystem 116 may include directional couplers 206, a correction circuit 208, and a cancellation circuit 210. In some aspects, the directional couplers 206 may be coupled to the antenna 108A by the circulator device 110. The directional couplers 206 may be passive devices for providing a sample of a signal in a signal path. For example, the directional couplers 206 may sample transmit signals routed from the transmit path 114 to the antenna 108A. Each directional coupler 206 may have three ports: an input port, an output port, and a couple port. The transmit signals may be received by the directional coupler 206 at the input port, a sample of the transmit signal may be transmitted from the couple port, and the directional coupler 206 may be coupled to the antenna 108A at the output port. In some aspects, the directional couplers 206 may be configured to measure forward and reflective power of the transmit signals routed by the circulator device 110 to the antenna 108. The forward and reflective power may be summed to generate a sample of the transmit signals.

A sample of the transmit signals may be routed to the correction circuit 208. The correction circuit 208 may include circuit components arranged and configured to correct for finite directivity caused by the directional couplers 206. For example, due to the limited isolation in the directional couplers 206, a portion of the forward power may leak into the reflective port causing imperfections in the transmit signal samples due to the finite directivity. The correction circuit 208 may correct for the imperfections in the transmit signal samples. In some aspects, the correction circuit 208 may also remove or reduce undesired components of the transmit signal samples. For example, the limited isolation properties of the circulator device 110 may allow transmit signals routed to the antenna 108A to include distortion products caused by receive signal components routed from the antenna 108A to the receive path 112 by the circulator device 110. In some aspects, the correction circuit 208 may include a summer device to sum a transmit signal sample processed by the correction circuit 208 to remove the imperfections with another transmit signal sample that was not previously processed by the correction circuit 208 to generate a signal having no receive signal components.

The correction circuit 208 may be coupled to the cancellation circuit 210. The cancellation circuit 210 may couple the distortion cancellation subsystem 116 to the receive path 112. In some aspects, the cancellation circuit 210 may include devices for receiving receive signals traversing the receive path 112. Additional components may be included in the cancellation circuit 210 to minimize distortion products in the receive signals created by components of the transmit signals that are received by, and routed through, the circulator device 110. For example, the cancellation circuit 210 may include one or more devices to sum a receive signal traversing the receive path 112 with a signal having only (or mostly) transmit signal components to minimize distortion products in the receive signal created by the transmit signal components.

Figure 3:
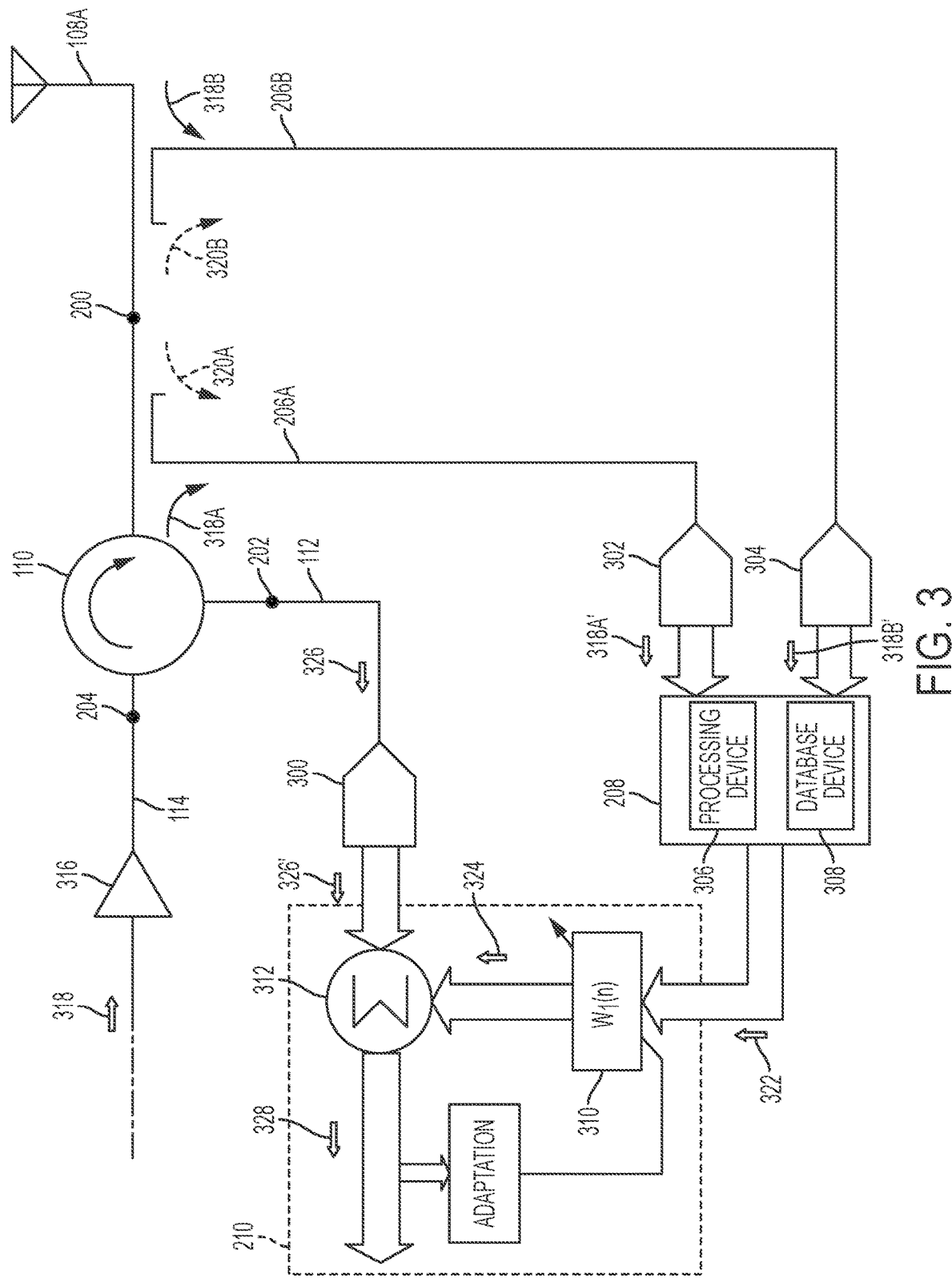
FIG. 3 is a schematic diagram of an example of a distortion cancellation subsystem according to one aspect.

FIG. 3 shows a schematic view of one example of the correction circuit 208 and the cancellation circuit 210 that may be included in the distortion cancellation subsystem 116 of FIG. 2 according to one aspect of the present disclosure.

The circulator device 110 may couple the antenna 108A to the receive path 112 and the transmit path 114 via ports, 200, 202, 204, respectively. Directional couplers 206A, 206B are coupled to the antenna 108A proximate to port 200 of the circulator device 110. In some aspects, the directional couplers 206A, 206B may be coupled to the antenna 108A, 108B to sample transmit signals routed to the antenna 108A by the circulator device 110. Although two directional couplers 206A, 206B are shown in FIG. 2, any number of directional couplers may be used to sample a transmit signal, including one, without departing from the scope of the present disclosure. In some aspects, however, samples from a single directional coupler may contain some level of a receive signal that may not be desirable to cancel. In such aspects, multiple directional couplers (e.g., two directional couplers 206A, 206B may be used to obtain the samples). The directional couplers 206A, 206B may route the samples of the transmit signals to the correction circuit 208 to remove imperfections in the samples caused by the finite directivity of the directional couplers 206A, 206B. The output of the correction circuit 208 may be routed to the cancellation circuit 210 to minimize distortion products in receive signals traversing the receive path 112 caused by components of transmit signals traversing the transmit path 114.

The cancellation circuit 210 may be positioned in the receive path 112 to receive the receive signals traversing the receive path 112. In some aspects, a receiver device 300 may be positioned in the receive path 112 between the circulator device 110 and the cancellation circuit 210 as shown in FIG. 3. In additional and alternative aspects, receiver devices 302, 304 may be positioned between the directional couplers 206A, 206B, respectively, and the correction circuit 208. In some aspects, the receiver devices 300, 302, 304 may include a full receiver. For example, the receiver devices 300, 302, 304 may include one or more devices, including mixers, filters, or other devices, depending on the method for sampling the received signals and transmit signals. In other aspects, the receiver devices 300, 302, 304 may include digital receivers having analog-to-digital converters. In these aspects, the receiver devices 300, 302, 304 may be configured to digitize received samples of the receive signals or transmit signals prior to routing them to the cancellation circuit 210 or correction circuit 208, respectively.

In some aspects, the correction circuit 208 may include a processing device 306 and a database device 308 as shown in FIG. 3. The processing device 306 may include a single processing device or multiple processing devices. Non-limiting examples of the processing device 306 may include a microprocessor, an application-specific integrated circuit ("ASIC"), a field-programmable gate array ("FPGA"), etc. The database device 308 may be coupled to the processing device 306. In some aspects, the database device 308 may include a non-volatile memory 212 having a memory device that retains stored information (e.g., electrically-erasable and programmable read-only memory ("EEPROM"), a flash memory, or any other type of non-volatile memory, etc.). In additional and alternative aspects, the database device 308 may include a medium from which the processing device 306 may read instructions or other stored information for processing signal samples transmitted by the directional couplers 206A, 206B. For example, values for the processing necessary to correct for coupler directivity may be stored in the database device 308 for use by the processing device 306. In some aspects, the antenna 108A coupled to the circulator device 110 may include calibration standards having associated measurements that may be taken and stored in the database device 308 for use by the processing device 306. In further aspects, the values stored in the database device 308 may be obtained using a calibration process similar to that used for a vector network analyzer. In one example, the input and output ports of the two directional couplers 206A, 206B may create a four-port model with an scattering parameter ("S-parameter") matrix. The processing device 306 may execute instructions to reduce the four-port matrix to a two-port matrix, yielding an equation having three unknown values. The unknown values may be determined by the processing device 306 using measurements stored in the database device 308 using different reflection coefficients. In some aspect, the output of the correction circuit 208 may include a signal having only or mostly components of the transmit signal.

The cancellation circuit 210 may be coupled to the correction circuit 208 to receive the output of the correction circuit 208. The cancellation circuit 210 shown in FIG. 3 includes an adaptive filter 310, a summer device 312, and an adaptation circuit 314. In some aspects, the adaptive filter 310 may be configured to filter signals received from the correction circuit 208 using a transfer function $w_1(n)$. In this manner, the adaptive filter 310 may adjust the level and the phase of the signals received from the correction circuit 208. The summer device 312 may be coupled to the adaptive filter 310 and positioned in the receive path 112 to receive both the output signals from the adaptive filter 310 as well as receive signals traversing the receive path 112. Although only one summer device is shown in FIG. 3, in other examples, any number of summer devices may be used. The output signals from the adaptive filter 310 may be with the receive signals from the receiver device 300 in the receive path 112 to cancel distortion products generated by the transmit signal from the receive signal.

In some aspects, the adaptation circuit 314 may be coupled to the adaptive filter 310 and the summer device 312 to adjust the error of the adaptive filter 310. In some aspects, the error of the adaptive filter 310 may be adjusted by the adaptation circuit 314 to minimize the contribution of transmit signal components to the output of summer device 312. For example, the adaptation circuit 314 may be positioned to receive the output of the summer device 312. The output of the adaptation circuit 314 may be an error signal based on the output of the summer device 312 that is fed back to the adaptive filter 310 to adjust the error of the adaptive filter 310. An amplifier 316 may be positioned in the transmit path 114. In some aspects, the amplifier 316 may be a low-noise amplifier positioned proximate to port 204 of the circulator device 110 to reduce the noise in and amplify transmit signals traversing the transmit path 114 prior to circulator device 110 routing the transmit signals to the antenna 108A for transmission. For example, transmit signal 318 represented by the solid arrow in FIG. 3 may represent a transmit signal traversing the signal path. In some aspects, the amplifier 316 may amplify the transmit signal 318 and the circulator device 110 may route the transmit signal 318 to the antenna 108A for transmission.

In additional aspects, the directional couplers 206A, 206B may sample the transmit signal 318 prior to transmission by the antenna 108A to generate samples 318A, 318B, respectively. The samples 318A, 318B may include errors due to imperfections 320A, 320B, respectively, represented by the dotted arrows. The imperfections 320A, 320B may be caused by the finite directivity of directional couplers 206A, 206B. In one example, directional coupler 206A may be a 20 dB coupler. Directional coupler 206A may receive the sample 318A of the transmit signal 318 traveling in the forward direction (from left to right) where the coupled signal, sample 318A is 20 dB below incident level. This sample may also contain errors due to signals travelling in the reverse direction (right to left) due to imperfections 320A. The level of this error component may be 30 dB below that created for an equal level signal travelling in the forward direction for a directional coupler 206A having 30 dB directivity. The samples 318A, 318B with the imperfections 320A, 320B, respectively, may be transmitted to receiver devices 302, 304, respectively.

In some aspects, the receiver devices 302, 304 may digitize the respective samples 318A, 318B (including the imperfections (320A, 320B) to generate and output digitized samples 318A', 318B' to the correction circuit 208 for processing to correct for the imperfections 320A, 320B. The correction circuit 208 may output a corrected transmit signal 322. In some aspects the corrected transmit signal 322 may contain only (or mostly) transmit signal components and no receive signal components or imperfections 320A, 320B. The corrected transmit signal 322 may be routed to the cancellation circuit 210 for further processing. For example, the corrected transmit signal 322 may be routed to the adaptive filter 310 of the cancellation circuit 210.

The adaptive filter 310 may adjust a level and a phase of the corrected transmit signal 322 to generate an output signal 324. The cancellation circuit 210 may be positioned in the receive path 112 to receive signals traversing the receive path in addition to the corrected transmit signal 322 generated by the correction circuit 208. For example, receive signal 326 may represent a receive signal received from the antenna 108A and routed to the receive path 112 by the circulator device 110. The circulator device 110 may route the receive signal 326 to the receiver device 300. In some aspects, the receiver device 300 may digitize the receive signal 326 to generate a digitized receive signal 326' to route to the cancellation circuit 210. The summer device 312 in the cancellation circuit 210 may receive both the output signal 324 from the adaptive filter 310 and the digitized receive signal 326. The summer device 312 may sum the output signal 324 and the digitized receive signal 326 to minimize transmit signal components in the digitized receive signal 326. In some aspects, the combined signal 328 may represent a receive signal having minimal to no distortion products created by the transmit signal 318.

Figure 4:
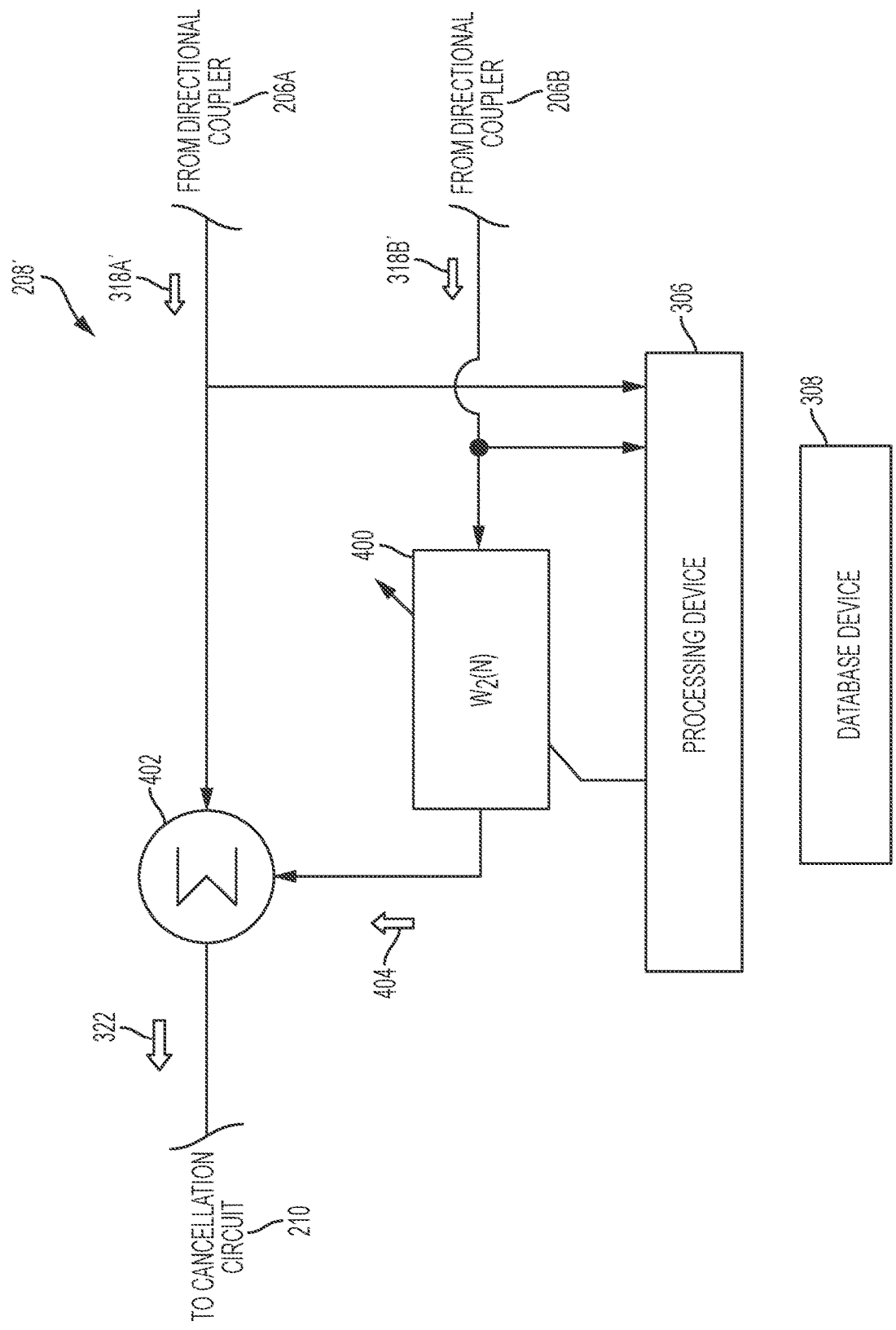
FIG. 4 is a schematic diagram of an example of a correction circuit for a distortion cancellation subsystem according to one aspect.

FIG. 4 shows a schematic view of components that may be included in a correction circuit 208'. In some aspects, components in the correction circuit 208' may replace or supplement the components of correction circuit 208' described in FIG. 3. The correction circuit 208' may include the processing device 306 coupled to the database device 308 shown in FIG. 3. The processing device 306 may be further coupled to an adaptive filter 400. The adaptive filter 400 may be coupled to a summer device 402. The adaptive filter 400 may be further coupled to the directional coupler 206B shown in FIG. 3. In some aspects, the adaptive filter 400 may be coupled to the directional coupler 206B via the receiver device 304. The summer device 402 may be further coupled to the directional coupler 206A shown in FIG. 3. In some aspects, the summer device 402 may be coupled to the directional coupler 206A via the receiver device 302. The processing device 306 may receive the digitized samples 318A', 318B'. In some aspects, the processing device 306 may process the digitized samples 318A', 318B' using the S-parameter matrix based on the input and output ports of the directional couplers 206A, 206B as described above with respect to FIG. 3 to determine a true transmit signal (e.g., the transmit signal 318 represented by transmit signal samples 318A, 318B without the imperfections 320A, 320B). The digitized sample 318B' may be routed to the adaptive filter 400. A transfer function $w_2(n)$ may be applied to the digitized sample 318B' by the adaptive filter with the adaptive filter 400 using values determine by the processing device 306 based on the digitized samples 318A' 318B' and information in the database device 308 as described above with respect to FIG. 3 to generate a signal 404. In some aspects, the signal 404 may represent the transmit signal 318 without any imperfections 320A, 320B due to the finite directivity of the directional couplers 206A, 206B. The summer device 402 may sum the digitized sample 318A' received from the directional coupler 206A via the receiver device 302 shown in FIG. 3 with the signal 404 to generate the corrected transmit signal 322 having no receive signal components.

Figure 5:
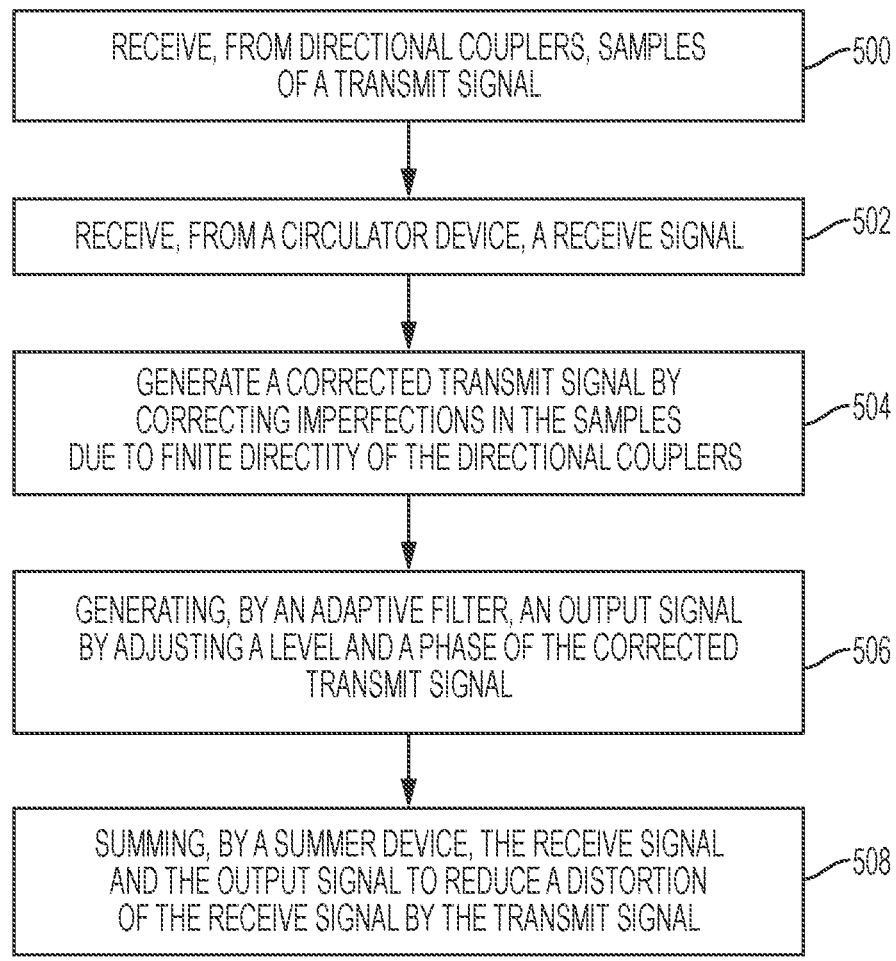
FIG. 5 is a flowchart of a process for minimizing distortion of a receive signal in a telecommunications system according to one aspect.

FIG. 5 shows a flowchart describing an example of a process for minimizing distortion of a receive signal in a telecommunications system according to one aspect. The process is described with respect to FIGS. 3-4, although other implementations are possible.

In block 500, the correction circuit 208, 208' may receive samples 318A, 318B, sampled by the directional couplers 206A, 206B respectively. In some aspects, the samples 318A, 318B may be digitized samples 318A', 318B'. For example, the transmit signal 318 traversing the transmit path 114 may be an analog signal. The directional couplers 206A, 206B may be coupled to the antenna 108A to sample the transmit signal 318 subsequent to the transmit signal 318 being routed to the antenna 108A by the circulator device 110. The directional couplers 206A, 206B may route the samples 318A, 318B with the imperfections 320A, 320B to the receiver devices 302, 304, respectively. The receiver devices 302, 304, may convert the samples 318A, 318B from analog signals to digital signals using one or more analog-to-digital converters included in the receiver devices 302, 304. The digitized samples 318A', 318B' (which include the imperfections 320A, 320B, respectively) may be received by the processing device 306 of the correction circuit 208' as shown in FIG. 4. The digitized sample 318B' may further be routed to the adaptive filter 400. The digitized sample 318A' may further be routed to the summer device 402.

In block 502, the cancellation circuit 210 may receive the receive signal 326 traversing the receive path 112. The receive signal 326 may be routed to the receive path 112 by the circulator device 110. In some aspects, the receive signal 326 may include the digitized receive signal 326' that may be received by the cancellation circuit 210. For example, receive signal 326 may be an analog signal received by the antenna 108A and routed by the circulator device 110 to the receive path 112. The receiver device 300 may be positioned in the receive path 112 and include one or more analog-to-digital converters for generating digitized receive signal 326'. In some aspects, the digitized receive signal 326' may be received by the summer device 312 of the cancellation circuit 210.

In block 504, the correction circuit 208, 208' may generate the corrected transmit signal 322. In some aspects, the correction circuit 208' may generate the corrected transmit signal 322 by removing or otherwise correcting the imperfections 320A, 320B from the digitized samples 318A', 318B' as described in FIG. 4. In some aspects, the processing device 306 may be used to correct the imperfections 320A, 320B. For example, the processing device 306 may execute instructions from the database device 308 to identify the imperfections 320A, 320B included in the digitized samples 318A', 318B'. In some aspects, the processing device 306 may output a signal to the adaptive filter 400 to remove the imperfections 320A, 320B from the digitized samples 318A', 318B'. In some aspects, the summer device 402 may sum the output of the adaptive filter 400 and the digitized sample 318A' from the directional coupler 206A to generate the corrected transmit signal 322 having minimal to no imperfections 320A, 320B or receive signal components.

In block 506, the adaptive filter 310 may generate the output signal 324 as shown in FIG. 3. In some aspects, the output signal 324 may be generated from the corrected transmit signal 322. For example, the adaptive filter 310 may apply the transfer function $w1(n)$ to adjust the level of the corrected transmit signal 322 and the phase of the corrected transmit signal 322. In some aspects, the adaptive filter 310 may be a closed-loop adaptive filter that may use an error signal generated by the adaptation circuit 314 to adjust for any error in the adaptive filter 310.

In block 508, the summer device 312 may sum the output signal 324 generated by the adaptive filter 310 and the digitized receive signal 326'. In some aspects, the output signal 324 may include only (or mostly) transmit signal components. In additional aspects, the digitized receive signal 326' may include some transmit signal components due to the finite isolation of the circulator device 110 between the receive path 112 and the transmit path 114. Combining the output signal 324 with the digitized receive signal 326' may minimize the transmit signal components from the digitized receive signal 326' to generate the signal 328. In some aspects, the signal 328 may be the digitized receive signal 328 having minimal to no distortion products from the transmit signal 318. In some aspects, the digitized receive signal 328 may be sampled by the adaptation circuit 314 to generate an error signal for tuning the adaptive filter 310 to correct errors in the adaptive filter 310.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:
1. A telecommunications system, comprising:
a circulator device couplable between (i) an antenna and (ii) a transmit path and a receive path, the antenna positionable in the telecommunications system to transmit downlink signals and receive uplink signals;
directional couplers couplable to the antenna and configured to generate samples of a transmit signal subsequent to the transmit signal being routed to the antenna by the circulator device;
a correction circuit couplable to the directional couplers, wherein the correction circuit is configured to correct imperfections in the samples due to finite directivity of the directional couplers and output a corrected transmit signal;

an adaptive filter coupled to the correction circuit, wherein the adaptive filter is configured to generate an output signal by adjusting a level and a phase of the corrected transmit signal; and a summer device in the receive path, wherein the summer device is configured to sum the output signal with a receive signal in the receive path to reduce distortion of the receive signal by the transmit signal.

2. The telecommunications system of claim 1, wherein the correction circuit includes:

a processing device;

a database device including calibration information usable by the processing device to correct the imperfections in the samples; and a second adaptive filter couplable to the processing device.

3. The telecommunications system of claim 2, further including a second summer device couplable to the second adaptive filter and a first directional coupler of the directional couplers to generate a corrected transmit signal having no receive signal components.

4. The telecommunications system of claim 1, wherein the correction circuit is couplable to the directional couplers by corresponding receiver devices, the corresponding receiver devices being positionable between the directional couplers and the correction circuit, wherein the corresponding receiver devices are configured to receive the samples from the directional couplers.

5. The telecommunications system of claim 4, wherein the corresponding receiver devices include digital receivers having analog-to-digital converters configured to digitize the samples.

6. The telecommunications system of claim 1, further including a receiver device positioned in the receive path between the circulator device and the summer device, wherein the receiver device is configured to receive the receive signal.

7. The telecommunications system of claim 1, wherein the circulator device is positionable in a remote unit of the telecommunications system.

8. The telecommunications system of claim 1, wherein the circulator device is positionable (i) between the transmit path and the antenna to transfer power from the transmit path to the antenna and (ii) between the antenna and the receive path to transfer power between the antenna and the receive path.

9. A distortion cancellation subsystem for a telecommunications system, comprising:

a correction circuit couplable to a first directional coupler and a second directional coupler, wherein the correction circuit is configured to receive a first sample and a second sample of a transmit signal subsequent to the transmit signal being routed to an antenna by a circulator device, the correction circuit including a first adaptive filter couplable to a processing device and a first summer device, wherein the correction circuit is configured to correct imperfections in the first sample and the second sample caused by finite directivity of the first directional coupler and the second directional coupler; and a cancellation circuit couplable to (i) a receive path to receive a receive signal routed to the receive path by the circulator device and (ii) the correction circuit to receive a corrected transmit signal generated by the correction circuit, the cancellation circuit including a second adaptive filter and a second summer device, the second adaptive filter couplable to the correction circuit to generate an output signal using the corrected transmit signal, the second summer device couplable to the receive path and to the second adaptive filter, wherein the second summer device is configured to reduce distortion of the receive signal by transmit signal components.

10. The distortion cancellation subsystem of claim 9, further including digital receivers corresponding to the first directional coupler and to the second directional coupler, each of the digital receivers including an analog-to-digital converter for digitizing the first sample and the second sample.

11. The distortion cancellation subsystem of claim 9, further including a digital receiver positionable in the receive path between the circulator device and the cancellation circuit, wherein the digital receiver is configured to digitize the receive signal.

12. The distortion cancellation subsystem of claim 9, wherein the processing device is couplable to the first directional coupler and the second directional coupler to receive the first sample and the second sample, wherein the first adaptive filter is couplable to the first directional coupler to receive the first sample, wherein the first summer device is couplable to the second directional coupler to receive the second sample.

13. The distortion cancellation subsystem of claim 9, further including a database device couplable to the processing device, the database device including instructions for causing the processing device to determine the imperfections in the first sample and the second sample.

14. The distortion cancellation subsystem of claim 9, wherein the cancellation circuit further includes an adaptation circuit couplable to the second summer device and the second adaptive filter, wherein the adaptation circuit is configured to correct error in the second adaptive filter based on an output of the second summer device.

15. The distortion cancellation subsystem of claim 9, wherein the correction circuit and the cancellation circuit are positionable in a remote unit of the telecommunications system.

16. A method, comprising:

receiving, from directional couplers, samples of a transmit signal subsequent to the transmit signal being routed to an antenna by a circulator device, wherein the antenna is positionable in a telecommunications system to transmit downlink signals and receive uplink signals;

receiving, from the circulator device, a receive signal traversing the receive path;

generating, by a correction circuit, a corrected transmit signal by correcting imperfections in the samples due to finite directivity of the directional couplers;

generating, by an adaptive filter, an output signal by adjusting a level and a phase of the corrected transmit signal; and summing, via a summer device, the receive signal and the output signal to reduce a distortion of the receive signal by the transmit signal.

17. The method of claim 16, wherein the corrected transmit signal includes no receive signal components.

18. The method of claim 16, further comprising adjusting, via an adaptation circuit, an error of the adaptive filter to reduce a contribution of transmit signal components to an output of the summer device, wherein the adaptation circuit is positioned in a signal path between the summer device and the adaptive filter.

19. The method of claim 16, further comprising digitizing, via one or more digital receivers, the samples received from the directional couplers and the receive signal received from the circulator device.

20. The method of claim 16, wherein the samples include a first sample and a second sample,
    wherein generating the corrected transmit signal includes:
        identifying, by a processing device, the imperfections in the samples;
        filtering, via a second adaptive filter coupled to the processing device, the first sample; and
        summing, via a second summer device, a signal from the second adaptive filter and the second sample.

\* \* \* \* \*